(12) United States Patent
Panas et al.

(10) Patent No.: US 12,631,754 B2
(45) Date of Patent: May 19, 2026

(54) SYSTEMS AND METHODS FOR ARRAYED IMAGE SWITCHING

(71) Applicants:Lawrence Livermore National Security, LLC, Livermore, CA (US); Bright Silicon Technologies, Inc., San Francisco, CA (US); Raytheon Company, Waltham, MA (US); Santa Barbara Infrared, Inc., Santa Barbara, CA (US)

(72) Inventors: Robert Matthew Panas, Dublin, CA (US); Robert S. McHenry, San Francisco, CA (US); Gerald P. Uyeno, Tucson, AZ (US); Joe Laveigne, Buellton, CA (US); Gabe Amparan, Goleta, CA (US)

(73) Assignees: Lawrence Livermore National Security, LLC, Livermore, CA (US); Bright Silicon Technologies, Inc., San Francisco, CA (US); Raytheon Company, Waltham, MA (US)

( * ) Notice: Subject to any disclaimer, the term of this patent is extended or adjusted under 35 U.S.C. 154(b) by 1065 days.

(21) Appl. No.: 17/725,048

(22) Filed: Apr. 20, 2022

(65) Prior Publication Data

US 2023/0341555 A1     Oct. 26, 2023

(51) Int. Cl.
*G01S 17/894*          (2020.01)
*G01S 7/481*           (2006.01)

(52) U.S. Cl.
CPC .......... *G01S 17/894* (2020.01); *G01S 7/4811* (2013.01); *G01S 7/4817* (2013.01)

(58) Field of Classification Search
CPC .... G01S 17/894; G01S 7/4811; G01S 7/4817; H04N 5/265; H04N 23/55; H04N 23/58
See application file for complete search history.

(56) References Cited

U.S. PATENT DOCUMENTS 6,382,513 B1    5/2002  Dvorkis et al.
2002/0176151 A1*  11/2002  Moon .................. G02B 27/126
                                                       359/298

(Continued)

*Primary Examiner* — Abdelaaziz Tissire
(74) *Attorney, Agent, or Firm* — HARNESS, DICKEY & PIERCE, P.L.C.

(57) ABSTRACT

The present disclosure relates to a system for forming a segmented optical imaging array for receiving an incoming optical signal. The system makes use of an arrayed image switch (AIS) having a plurality of independently tiltable reflecting elements each forming at least one of a respective image channel or a portion of a respective image channel, and each configured to receive at least a portion of the incoming optical signal. Each of the elements is responsive to electrical element pointing commands, and each is positionable at more than two different angles for receiving and reflecting at least a respective portion of the incoming optical signal as a respective output therefrom, either along an optical output path or at least partially away from the optical output path. An electronic controller generates the electrical element pointing commands for each one of the elements. A sensor disposed in the optical output path receives any one or more of the respective outputs from each one of the elements which are directed along the optical output path, and creates an image therefrom.

20 Claims, 3 Drawing Sheets

(56)          References Cited

U.S. PATENT DOCUMENTS

| | | | |
|---|---|---|---|
| 2004/0263943 A1* | 12/2004 | Starkweather | G02B 26/0833 |
| | | | 359/290 |
| 2007/0237486 A1* | 10/2007 | Godil | G02B 6/266 |
| | | | 385/140 |
| 2013/0141895 A1* | 6/2013 | Alpaslan | G02B 30/33 |
| | | | 362/97.3 |
| 2017/0118388 A1* | 4/2017 | Wippermann | G02B 13/0065 |
| 2018/0063424 A1* | 3/2018 | Wang | H04N 23/55 |
| 2018/0172945 A1* | 6/2018 | Wippermann | H04N 23/45 |
| 2018/0176437 A1* | 6/2018 | Wippermann | H04N 23/685 |
| 2018/0176471 A1* | 6/2018 | Wippermann | G02B 13/0065 |
| 2018/0176472 A1* | 6/2018 | Wippermann | H04N 23/58 |
| 2018/0180872 A1* | 6/2018 | Hopkins | G02B 7/182 |
| 2019/0068950 A1* | 2/2019 | Wippermann | H04N 23/45 |
| 2022/0333879 A1* | 10/2022 | Panas | F15D 1/007 |

* cited by examiner

SYSTEMS AND METHODS FOR ARRAYED IMAGE SWITCHING

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to optical imaging systems and methods, and more particularly to an optical imaging system and method which incorporates use of an arrayed image switch to image a scene using a plurality of independently tiltable reflecting elements, which are each associated with separate imaging channels, and to use outputs associated with the imaging channels to controllably modify an image received by an image sensor.

BACKGROUND

The statements in this section merely provide background information related to the present disclosure and may not constitute prior art.

There is an increasing need for faster steering and switching of optical systems in a wide range of fields, whether that is to increase capture rate or capture area for the imaging being performed. Conventionally, imaging systems are steered with gimbals or galvanometers, where the image passed to the sensor is set by the orientation of a single large reflector. However, modern electronics and applications are demanding speeds much faster than can be reached by this macroscopic steering. Projection systems increasingly require extremes in both resolution and refresh rates for state-of-the-art systems. These demands can also extend into multi-spectral projection, placing additional demands on the projection capabilities.

Gimbaled and galvanometer systems struggle to keep up with the increasing scale of image routing and incur significant size, weight and power demands which often dwarf the optics. Beyond image routing, high performance imaging systems are often vulnerable to single bright spots that wash out, blind or even damage the sensors, which can cause safety hazards in situations where sensors are being used to help guide vehicles like cars or aircraft. In both these cases, there is a need for improved image switching to provide dynamic control over the transfer of an image to the sensor, or from a source. The increasing need is for both rapid control and sub-aperture modulation of the image aperture.

In astronomical applications, existing approaches like coronagraphs require the use of an arrayed switching operation to block excess light into the sensor(s). This has been accomplished with active masks made of arrayed elements. One example of such an active mask is a DMD (https://www.spiedigitallibrary.org/conference-proceedings-of-spie/11447/114479Y/A-coronagraph-using-a-digital-micromirror-device-as-an-adaptive/10.1117/12.2561906.full?SSO=1), available from Texas Instruments, Inc. Unfortunately, these present approaches provide a binary solution, essentially limiting the arrayed image switch to a two-channel selection for each element, either an active channel or a channel with no light, the null channel. Such approaches can work well in very limited cases, but the lack of any further multiplexing beyond 1 active and 1 null channel, as well as the binary nature of this approach, has limited the utility of the binary switching approaches to niche applications like coronagraphy.

Accordingly, there is still a need in the art for an optics type switching system which does not suffer from the limitations of traditional, binary coronagraph-type approaches. More specifically, there is a need in the art for an optical switching system and method which is able to provide analog orientation control in a segmented array of optical receiving elements. Such an approach would provide a number of significant benefits such as being able to multiplex an optical receiving element well beyond the single active channel which now limits traditional binary, coronagraph-type approaches. Such a new analog orientation approach would also enable effectively analog intensity control over channel intensity for each element of a segmented array. Such large-scale multiplexing and intensity control for an arrayed image switch would significantly expand the range of applications for segmented array optical imaging systems, and would represent a very significant step beyond standard, present-day binary coronagraph-type approaches.

SUMMARY

This section provides a general summary of the disclosure, and is not a comprehensive disclosure of its full scope or all of its features.

In one aspect the present disclosure relates to a system for forming a segmented optical imaging array for receiving an incoming optical signal. The system includes an arrayed image switch (AIS) having a plurality of independently tiltable reflecting elements each forming at least one of a respective image channel or a portion of a respective image channel, and each configured to receive at least a portion of the incoming optical signal. Each of the elements is responsive to electrical element pointing commands, and each is positionable at more than two different angles for receiving and reflecting at least a respective portion of the incoming optical signal as a respective output therefrom, either along an optical output path or at least partially away from the optical output path. An electronic controller generates the electrical element pointing commands for each one of the elements. A sensor disposed in the optical output path receives any one or more of the respective outputs from each one of the elements which are directed along the optical output path, and creates an image therefrom.

In another aspect the present disclosure relates to a system forming a segmented optical imaging array for receiving an incoming optical signal. The system includes an arrayed image switch having a plurality of independently steerable reflecting elements array in a grid, and each forming at least one of a respective image channel or a portion of a respective image channel, and configured to receive at least a portion of the incoming optical signal. Each one of the plurality of independently steerable reflecting elements is responsive to electrical element pointing commands, and each is positionable at more than two different angles for receiving at least a respective portion of the incoming optical signal and reflecting the respective portion of the incoming optical signal as a respective output therefrom, either along an optical output path or at least partially away from the optical output path. The system further includes an electronic control system (ECS) configured to generate the electrical element pointing commands for each one of the plurality of independently steerable reflecting elements to cause controlled tilting of each one of the independently steerable reflecting elements to a desired angle. A sensor is disposed in the optical output path and is configured to receive any one or more of the respective outputs from each one of the plurality of independently steerable reflecting elements which are directed along the optical output path, and to create an image therefrom. The electrical element pointing commands control tilting of each one of the plurality of independently steerable reflecting elements in a manner to control an intensity of the respective outputs from each one of the independently steerable reflecting elements which are channeled into the output path to reach the sensor.

In still another aspect the present disclosure relates to a method for optically imaging a scene using an image sensor. The method comprises positioning an arrayed image switch having a plurality of independently steerable reflecting elements, each forming at least one of a respective image channel or a portion of a respective image channel, and configured to receive at least a portion of the incoming optical signal along its said respective image channel, at an initial pointing direction to image the scene. The method further includes controllably moving each one of the independently steerable reflecting elements to a desired angle of tilt to reflect all, or none, or only a portion of the image being received at each reflecting element, along an output signal path to the sensor. In this manner an intensity of a reflected signal from each one of the reflecting elements reaching the sensor is controlled.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2:
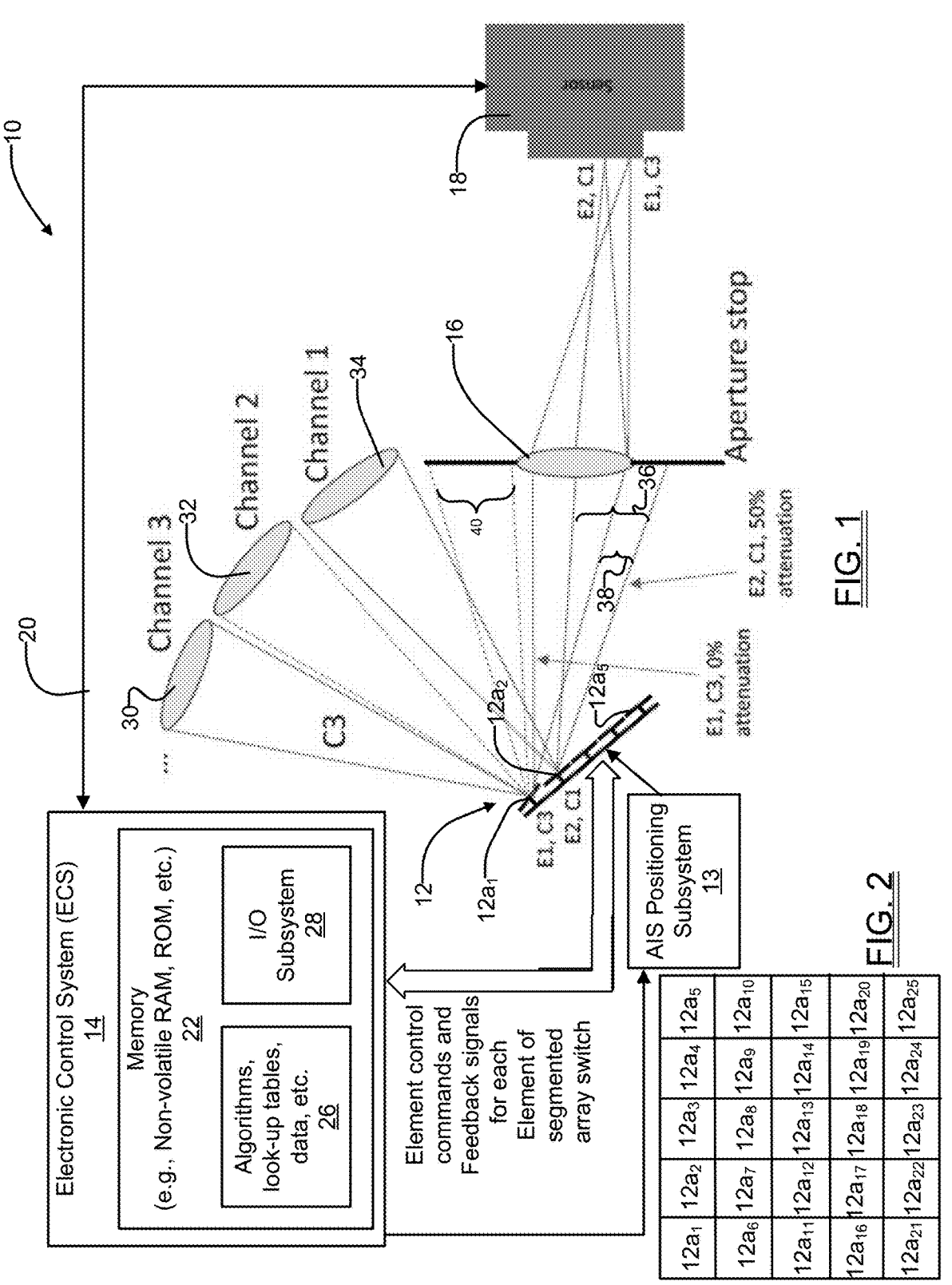
FIG. 1 is a high level block diagram of one embodiment of a system in accordance with the present disclosure.
FIG. 2 is a high level diagram plan diagram of the arrayed image switch of FIG. 1, illustrating the switch in this embodiment as a 5×5 grid of elements.

Example embodiments will now be described more fully with reference to the accompanying drawings.

The present disclosure is directed to systems and methods which involve the use of an array image switch which acts as an optical analog of an electronic switch, but in array form, in the optical domain. Broadly speaking, the array image switch operates by independently steering each of its elements to choose which incoming image or combination of images is passed to the output. This element steering is often done by rotation of the individual elements. The element steering does not change the image location but rather determines which input image shows up on the section of the aperture associated with the driven element. The switching provides several important advantages over prior developed binary-type Coronagraph systems. For one, the new array image switch can be switched quickly due to the small scale of the array, and in particular due to the small scale of the tiltable elements of the array. Another important advantage is that operation of the array image switch can be used to attenuate the intensity of light. Still another advantage is that multiple images can be superimposed on one another, all on an element-by-element basis. Thus, highly significant advantages provided by the new arrayed image switch are that it allows for dynamic image switching over part or all the aperture, as well as pixelated image attenuation, as well as multi-image stacking.

Image switching is valuable in many cases including when an optical system has a smaller field of view than the total field of regard, so many optical channels are possible, and the system must switch between them. In one instance, a high speed/resolution camera is shifted between a lenslet array to check each field of view. The system might also rapidly cycle through all views to overlay multiple images on the camera while it searches for a particular feature like a warning light. Once this is found, the system is able to remove channels from the cycling list until the feature disappears, providing a means to very rapidly determine the source of the warning light and switch to focus on that one sub-view. This could help planes or cars avoid collisions. This approach allows the camera to search a large area of space without a gimbal. In another instance, the secondary input to the image switch is a dark image and the switch is used to attenuate (0-100%) light to each element area in response to bright sources that might wash out the image or damage the sensor. The arrayed image switch described herein allows cameras to look at bright lights without washing out, enabling sensors to work in harsh environments and resist blinding or damage. Projectors can also use the arrayed image switch presented herein to rapidly scan between multiple input images, to increase projection rate or interleave images coming from different types of projectors to create a wide band image. The new arrayed image switch can also be used in an embodiment to provide an inverse approach to the above-described operation, where the arrayed image switch is enables a single input channel of captured images to be interleaved between multiple outputs to boost image capture rates.

Referring to FIG. 1, an arrayed image switch system 10 is shown in accordance with one embodiment of the present invention. In this embodiment the system 10 includes an arrayed image switch 12 (AIS) which is controlled by an electronic control system (ECS) 14, an aperture stop 16 and an optical image sensor 18. An optional AIS positioning subsystem 13 (e.g., one or motor motors) may be included for receiving positioning control commands from the ECS 14 and positioning the entire AIS 12 at an initial target or pointing direction.

The AIS 12 has a plurality of electrically responsive, independently steerable (e.g., controllably tiltable) reflecting mirror elements 12a which can be tilted in response to commands or control signals from the ECS 14 to receive (i.e., image) different portions of the image. FIG. 2 shows one highly simplified plan view of one example of the AIS elements 12a forming a 5×5 grid of square shaped elements 12a1-12a25. In practice, most applications of the AIS 12 are expected to use a far greater plurality of the elements 12a, and in some applications possibly hundreds or even thousands or more of such elements. And the elements 12a need not be arranged in a square grid, but could form other configurations (e.g., rectangular) to best suit a particular application. Furthermore, the elements 12a need not necessarily be square-shaped, but could be other shapes (e.g., rectangular, round, triangular, etc.), although it is expected that for most applications, square shaped or rectangular shaped elements are likely to be preferred.

The optical image sensor 18 may be formed by any number of different devices, but it expected that many applications, for example a saturation control approach mentioned above, will involve the use of a CCD or CMOS device, which provides feedback signals to the ECS 14 via a feedback signal communication line 20. The feedback signals may pertain to measured intensity by the sensor 18. The ECS 14 may include one or more of different types of non-volatile memory 22 (e.g., non-volatile RAM, ROM, etc.), and one or more of algorithms, look-up tables, data tables, etc. An input/output subsystem 28 may be included which provides one or more of a seral interface (e.g., RS-232; RS-422), a parallel interface, a USB interface, a BLUETOOTH® protocol interface, etc., to assist the ECS 14 in communicating with other computing or peripheral devices (e.g., desktop computers; laptops; computing tables, smartphones, display devices, etc.). The ECS 14 communication channels enable it to connect to other control systems. Some applications, like the sequential imaging of different fields of view described above, would not require direct feedback over the feedback signal communication line 20 from sensor 18 to AIS 12, instead the sensor 18 reading could pass to external control systems via the I/O system 28. The external control systems could interpret the sensor 18 signal and make decisions about which channels to pass to the sensor 18. The control architecture may also be changed to have both the sensor 18 and the ECS 14 directly wired to the external control systems without feedback between the sensor 18 and the ECS 14. The ECS 14 supplies electrical commands to the elements 12a of the AIS 12 to control the degree of tilt of each element, or put differently, the pointing of each element. The electrical commands may be modified in real time to enable modulation of each one of the elements 14a in real time between two or more tilt positions.

The algorithms stored in the memory 22 may be used by the ECS 14 to help control pointing of the elements 12a of the AIS 12, to help control multiplexing of the outputs of the elements, to help control switching between elements, to help control interleaving of images from two or more of the elements, as well as to carry out various other control functions such as applying piston compensation to slightly change focus for each element 12a. The look-up tables may be used to provide commands that correspond to different degrees of tilt per element for different operating modes. The look-up tables may also be used to store patterns of modulation between different channels so the sensor 18 sees a controlled pattern of channels with respect to time and spatial dispersion across the sensor 18 face.

In FIG. 1 it can be seen how the tilting of the elements 12a and 12a2 can be used to redirect all of part of the image being viewed by sensors $12a_1$ and 12a2. In this example element $12a_1$ is receiving photons representing a portion of a scene, which corresponds to cones 30 and 32, while element 12a2 is receiving photons corresponding to a portion of the scene represented by cone 34. Bracket 36 indicates the full optical signal being reflected by element 12a2 along an optical output path toward the aperture stop 16, wherein the aperture stop 16 is positioned in the optical output path. It can be seen that the tilting of element E2 $12a_2$ causes about 50% of the channel 1 optical signal to be directed away from the aperture stop 16, as indicated by bracket 38. In this example it can also be seen that the tilting of element E1 $12a_1$ causes channel 3 (30) to pass through the aperture stop 16 but directs channel 2 (32) against the aperture stop 16, meaning all of the channel 2 (32) light 40 is blocked by the aperture stop 16 and will not pass through to the sensor 18.

Figure 3:
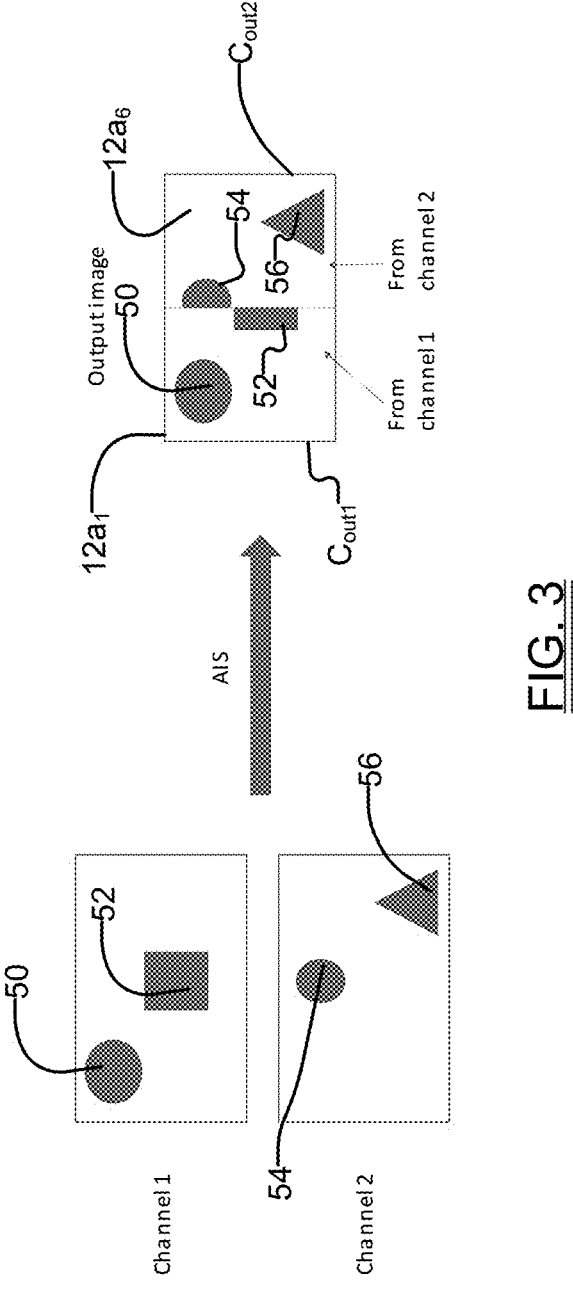
FIG. 3 is a diagram illustrating how two adjacent ones of the elements of the arrayed image switch image different objects in a scene, and then their channel outputs are used to create an optical output image.

Referring to FIG. 3, a high level diagram is presented to further illustrate how each of the elements 12a may view portions of different channels. In this example Channel 1 includes objects 50 and 52, And Channel 2 includes objects 54 and 56. Channels 1 and 2 in this example thus form a larger scene that the system 10 is imaging. The image location is not changed between the channel input and output, meaning that if the images were stacked on one another, all features would line up between the input channel and the output. The AIS 12 instead determines which channel is displayed on the output for the subsection associated with each element in the AIS. For this example, the left half of the elements 12a in the arrayed image switch 12 are steered to pass channel 1, to thus capture all of object 50 and about half of object 52 present in the scene, and its output is indicated by rectangle $C_{out1}$. Likewise, the right half of the elements 12a in the arrayed image switch 12 are steered to pass channel 2, to thus capture about half of object 54 and all of object 56 in the scene, and provide an output indicated by rectangle $C_{out2}$. The ECS 14 may use one or more of the stored algorithms, look-up tables, stored data, etc., to determine the correct steering angles for each element to choose the correct channel. This example shows two channels set adjacent to one another. The channels might also be set to have elements 12a passing channels in a 1, 2, 1, 2 . . . pattern, where every other element passes channel 1 and the remainder pass channel 2. This would result in a checker-board pattern on the output where each square on the checkerboard pattern corresponds to an element in the AIS 12 and a subsection of the output image. The appropriate channel 1 image subsections would be shown in the 'black squares', while the appropriate channel 2 image subsections would be shown in the 'white squares' of the checkerboard.

The above described operating modes and configurations provide a great deal of flexibility in using the available elements 12a of the AIS 12 in different ways to best meet the needs of diverse applications. Optionally, any of the elements 12a may be used to produce a multiplexed output that combines multiple channels on the same output subsection. This could be done by rapidly switching between the channels over time, so the effect is a time-averaged superposition. This could also be done by combining channels that are spatially close to one another, such as channels 2 (32) and 3 (30) in FIG. 1. With the right tilt angle, partially attenuated images of both could be aligned to pass through the output aperture 16, resulting in a superposition of both signals simultaneously.

Figure 4:
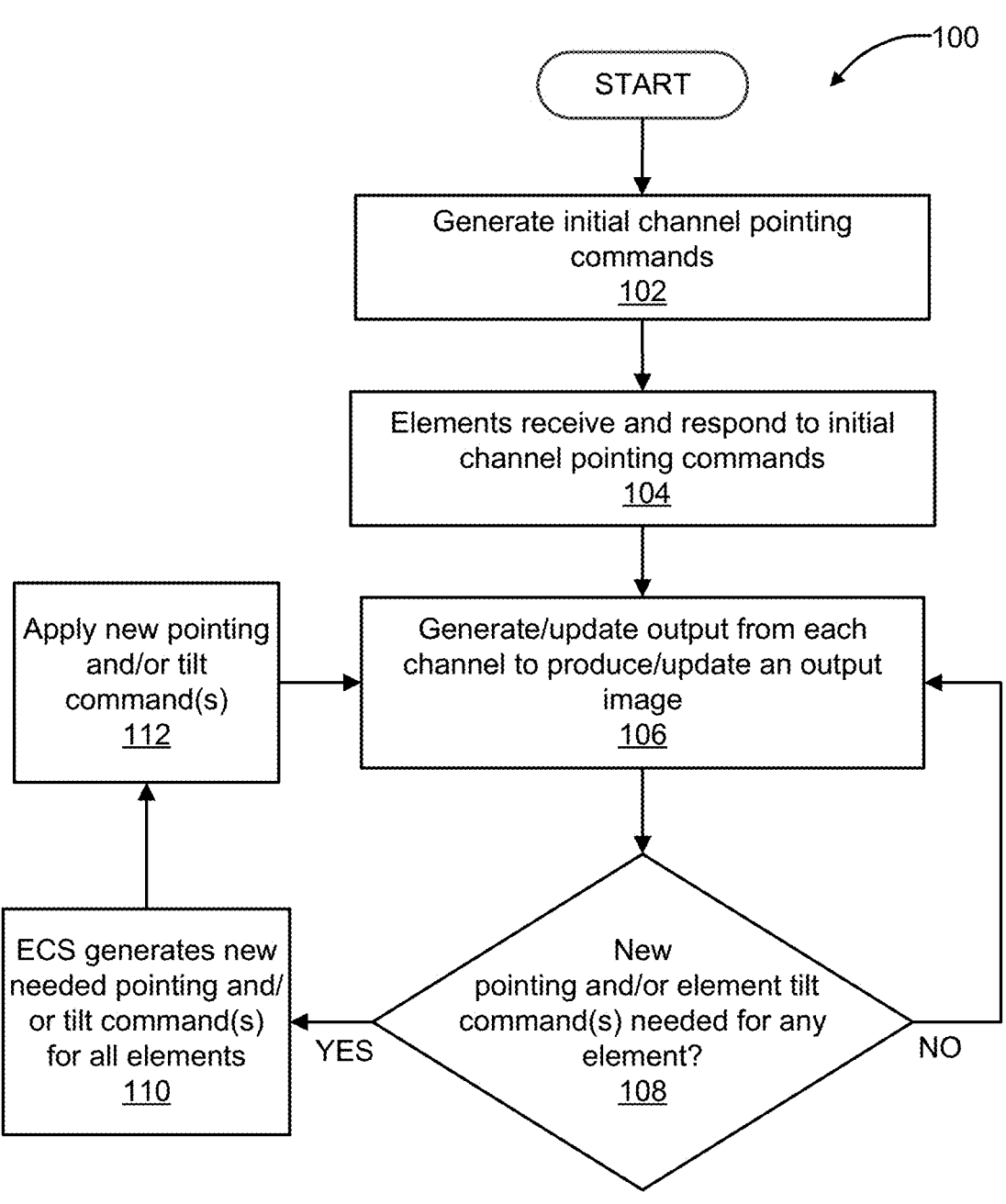
FIG. 4 is a high level flowchart showing one example of various high level operations that may be performed by the system of FIG. 1 during operation.

Referring briefly to FIG. 4, a high level flowchart 100 is shown illustrating one example of high level operations that may be performed by the system 10. In this example the system 10 initially provides desired channel pointing commands for each of the elements 12a from the ECS 14 to image a scene, as indicated at operation 104. The elements 12a are then controlled to apply any degree of tilt that may be called for by the pointing commands, as indicated at operation 104. At operation 106 an output is generated from each channel to produce or update an output image. At operation 108 a check is made by the ECS 14 to determine if any new pointing and/or tilt commands are needed for any of the elements 12a, as indicated at operation 108. If this produces a "NO" answer, then the present channel outputs continue to be generated in forming the output image, as indicated at operation 106. However, if the check at operation 108 indicates that a new pointing or tilt command is needed for any one or more elements 12a, then the ECS 14 generates the needed commands, as indicated at operation 110, and the commands are applied by the elements 12a, as indicated at operation 112. The output image is then update as indicated at operation 106.

The various embodiments of the arrayed image switch and its related methods described herein are expected to find use in a wide variety of different industries and applications. Such diverse applications are likely to involve applications related to, but not limited to, security cameras, airline applications, image sensors used with self-driving vehicles; high speed image projection applications, and commercial satellite sensor protection applications.

One specific application of the new arrayed image switch is in connection with improved coronagraphy. The analog control over orientation of each element of the array allows the sun or other bright stellar body to be attenuated on an element-by-element basis, rather than completely blocked. This helps the sensor bring the whole image into roughly the same intensity scale, optimizing the image collection while retaining the ability to see the location of the parent star and features on it. This could also be used to help commercial satellites operate without getting blinded by the sun.

The security camera application mentioned above is expected to be used scanning cameras. Security cameras or cameras on autonomous vehicles may use multi-faceted lens covers over the segmented array, then the image switch can be controlled to rapidly hop between each facet to do a high-resolution scan in the facet, and then to move on. This decouples the system resolution from the field of regard, allowing for high resolution imaging and wide area coverage without exorbitant pixel array sizes. The arrayed image switch thus acts as a solid-state gimbal replacement, but the tradeoff is that that the orientation is discretized, and an optical element will be required for each desired field of view (such as a lenslet array). In certain cases, for example on airplanes or cars, such a configuration would be well fit to the application.

High dynamic range imaging is still another possible application of the arrayed image switch and its method of operation described herein. Analog attenuation on an element-by-element level allows sensors to expand their capture apertures and integration times to optimize their ability to see subtle details while avoiding saturation by attenuating the brightest parts of the image by using the arrayed image switch. This expands the system dynamic range well beyond the limits of the sensor itself. The tradeoff is that the heavily attenuated areas would likely see higher noise in the image after rescaling. In summary, such a system would be able to optimally capture low light images in almost any scenario with the tradeoff being that the brightest sections of the image would show increased noise. Given that the high intensity source is usually a distraction rather than the area of interest, this local increase in noise would in most cases have little impact on imaging. The sensor of such a system will still be able to capture details in a dark image, such as a star field, even with a bright light pointed at it.

High dynamic range projection is still another application of a system employing the arrayed image switch of the present disclosure. In this application, the sensor of the system could be used for image projection, where the source would operate at the highest intensity needed for the image, and then the arrayed image switch of the system acts as a spatially variable attenuator to help the image achieve lower signals in the darker areas. This would help increase the projection dynamic range by scaling down the lowest signals beyond the limits of the projector.

High-rate capture or projection is still another potential application of the new arrayed image switch. In this application, the multiplexing mode could be used to boost the projection rate by rapidly switching between multiple sources, while the demultiplexing mode could be used to boost the image capture rate.

It will be appreciated that the foregoing discussion of possible applications is not intended to be an exhaustive list of all possible applications and uses. But rather it is expected that further applications and uses will come to light as the capabilities of the arrayed image switch and its method of operation are fully realized and appreciated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system forming a segmented optical imaging array for receiving an incoming optical signal, the system comprising:
   an arrayed image switch having a plurality of independently steerable reflecting elements each forming at least one of a respective image channel or a portion of a respective image channel, and configured to receive at least a portion of the incoming optical signal;
   each one of said plurality of independently steerable reflecting elements being responsive to electrical element pointing commands, and each being positionable at more than two different angles for receiving at least a respective portion of the incoming optical signal and reflecting the respective portion of the incoming optical signal as a respective output therefrom, either along an optical output path or at least partially away from the optical output path;
   an electronic control system configured to generate the electrical element pointing commands for each one of the plurality of independently steerable reflecting elements; and
   a sensor disposed in the optical output path, and configured to receive any one or more of the respective outputs from each one of the plurality of independently steerable reflecting elements which are directed along the optical output path, and to create an image therefrom; and
   the tilting of each one of the plurality of independently steerable reflecting elements is controllable by the electronic control system to further enable multiple images created from the optical signals reflected by the reflecting elements to be superimposed on one another at the sensor to form a composite image.

2. The system of claim 1, further including an aperture stop positioned in the optical output path upstream of the sensor, relative to a path of travel of any one or more of the respective outputs directed along the optical output path.

3. The system of claim 1, wherein each one of said plurality of independently steerable reflecting elements is tiltable to reflect its associated said respective portion of the incoming optical signal:
   in full along the optical output path towards the sensor; or
   fully away from the optical output path; or
   at an intermediate angle wherein only a desired percentage of its respective said portion of the incoming optical signal is reflected along the optical output path, and a remainder is reflected away from the optical output path, to thus modify an intensity of the respective portion of the incoming optical signal which reaches the sensor.

4. The system of claim 1, wherein the plurality of independently steerable reflecting elements are arranged in a grid.

5. The system of claim 1, wherein the electronic control system includes a memory with one or more algorithms for helping to determine the electrical element pointing commands.

6. The system of claim 1, wherein the electronic control system includes one or more look-up tables for helping to determine the electrical element pointing commands.

7. The system of claim 1, further including a feedback signal line between the sensor and the electronic control system for enabling the sensor to provide feedback signals to the electronic control system.

8. A system forming a segmented optical imaging array for receiving an incoming optical signal, the system comprising:
   an arrayed image switch having a plurality of independently steerable reflecting elements array in a grid, and each forming at least one of a respective image channel or a portion of a respective image channel, and configured to receive at least a portion of the incoming optical signal;
   each one of said plurality of independently steerable reflecting elements being responsive to electrical element pointing commands, and each being positionable at more than two different angles for receiving at least a respective portion of the incoming optical signal and reflecting the respective portion of the incoming optical signal as a respective output therefrom, either along an optical output path or at least partially away from the optical output path;
   an electronic control system (ECS) configured to generate the electrical element pointing commands for each one of the plurality of independently steerable reflecting elements to cause controlled tilting of each one of the independently steerable reflecting elements to a desired angle;
   a sensor disposed in the optical output path, and configured to receive any one or more of the respective outputs from each one of the plurality of independently steerable reflecting elements which are directed along the optical output path, and to create an image therefrom; and
   wherein the electrical element pointing commands control tilting of each one of the plurality of independently steerable reflecting elements in a manner to control an intensity of the respective outputs from each one of the independently steerable reflecting elements which are channeled into the output path to reach the sensor; and the tilting of each one of the independently steerable reflecting elements is controllable by the electronic control system to further enable multiple images created from the optical signals reflected by the reflecting elements to be superimposed on one another at the sensor to form a composite image.

9. The system of claim 8, further including an aperture stop disposed in an optical path between the sensor and the arrayed image switch.

10. The system of claim 8, further including a feedback signal line coupled between the sensor and the electronic control system for enabling the sensor to provide feedback signals to the electronic control system.

11. The system of claim 8, wherein the sensor comprises at least one of:

a charge coupled display (CCD); or a CMOS device.

12. The system of claim 8, further comprising an AIS positioning subsystem responsive to the electronic control system for controlling at least an initial pointing orientation of the AIS.

13. The system of claim 8, wherein the electronic control system includes a memory for storing one or more algorithms for helping to determine the electrical element pointing commands.

14. The system of claim 8, wherein the electronic control system includes one or more look-up tables for helping to determine the electrical element pointing commands.

15. The system of claim 8, wherein the electronic control system controls each of the plurality of independently steerable reflecting elements in real time.

16. A method for optically imaging a scene using an image sensor, the method comprising:

positioning an arrayed image switch having a plurality of independently steerable reflecting elements, each forming at least one of a respective image channel or a portion of a respective image channel, and configured to receive at least a portion of an incoming optical signal along its said respective image channel, at an initial pointing direction to image the scene;

controllably moving each one of said plurality of independently steerable reflecting elements to a desired angle of tilt to reflect all, or none, or only a portion of the image being received at each said independently steerable reflecting element, along an output signal path to the sensor, such that an intensity of a reflected signal from each one of said independently steerable reflecting elements reaching the sensor is controlled; and further using an electronic control system to control the tilting of each one of the independently steerable reflecting elements to further enable multiple images created from the optical signals reflected by the reflecting elements to be superimposed on one another at the sensor to form a composite image.

17. The method of claim 16, wherein the intensity of the reflected signal from each one of said independently steerable elements is controlled between 100 percent and zero percent when reaching said image sensor.

18. The method of claim 16, further comprising selectively controlling the independently steerable elements in real time to enable an intensity of at least certain ones of the reflected signals from at least certain ones of the independently steerable elements to be modulated.

19. The method of claim 18, further comprising using an electronic control system to control tilting of each one of the plurality of independently steerable elements.

20. The method of claim 19, further comprising using the electronic control system to receive feedback commands from the image sensor.

* * * * *